United States Patent Office 2,937,989
Patented May 24, 1960

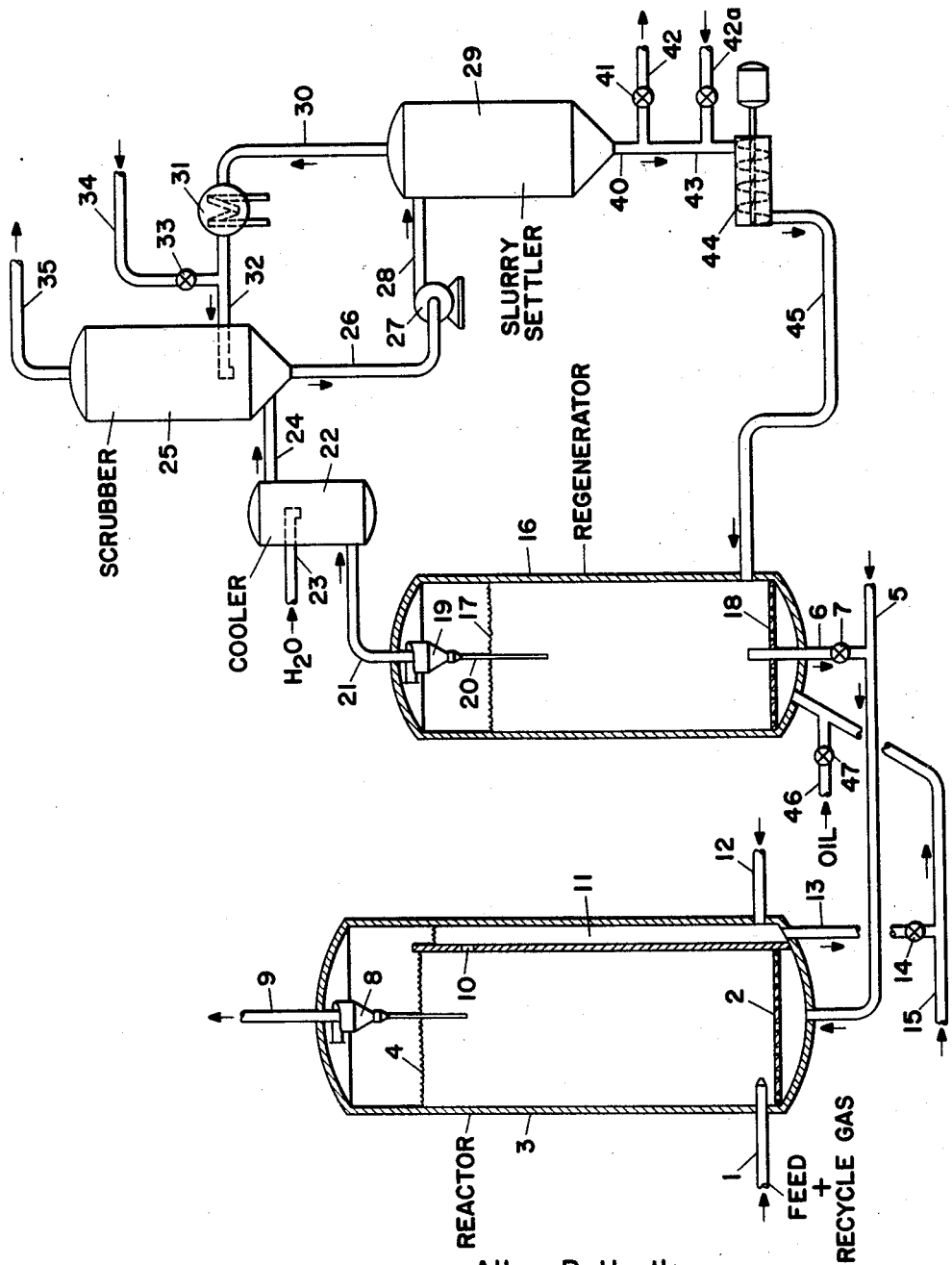
May 24, 1960     A. R. HUNTLEY ET AL     2,937,989
CATALYST FINES RECOVERY AND CONTROL SYSTEM
Filed Sept. 3, 1957
Allan R. Huntley
Robert C. Morbeck    Inventors
Walter G. May
By H. N. Feyrer Attorney

2,937,989

CATALYST FINES RECOVERY AND CONTROL SYSTEM

Allan R. Huntley, Cranford, Robert C. Morbeck, Westfield, and Walter G. May, Union, N.J., assignors to Esso Research and Engineering Company, a corporation of Delaware Filed Sept. 3, 1957, Ser. No. 681,716

6 Claims. (Cl. 208—140)

This invention pertains to the catalytic conversion of hydrocarbons and particularly to a fluidized solids hydrocarbon conversion process in which the catalyst "fines" particles which are entrained with the flue gases and which pass through the regenerator cyclones are caught and returned to the regenerator. According to the invention these catalyst fines are recovered by scrubbing the gases with a small amount of a low metals gas oil. The slurry of catalyst and oil so formed is then returned to the regenerator.

By this process the heat in the regenerator flue gases is recovered and also additional heat is added to the regenerator by the burning of the gas oil in which the fines are returned to the regenerator. The present process is particularly advantageous in a platinum fluidized solids hydroforming system where (1) loss of extremely expensive catalyst must be prevented and (2) where because of the low carbon make on the catalyst, additional heat must be supplied to the regenerator in order to heat the circulated catalyst particles to the desired temperature for supply to the reactor. Additionally, catalyst circulation rates may be higher than in fluid molybdenum oxide hydroforming because undesirable excess carbon laydown with accompanying poor conversion to desired products is not experienced with freshly regenerated platinum catalyst. Thus, more heat may be supplied to the highly endothermic hydroforming reaction by means of heated catalyst than is possible in fluid molybdenum hydroforming.

Another advantage for burning oil in the regenerator and thus for returning the fines slurry in oil to the regenerator is present where presently existing commercial size fluid molybdenum oxide type hydroforming equipment is to be converted to fluid platinum catalyst service. Since less carbon is laid down on the catalyst, excess air capacity is available in the regenerator and this may be economically used by burning oil and thus supplying additional heat to the reactor with the catalyst in this way.

Alternatively or at intervals, by the present invention, catalyst fines in the reactor overhead are recovered and sent to processing to be reworked into coarser particles. Also, if desired, these particles before reworking may be classified so that the coarser fraction of the fines which does not need reworking may be returned to the regenerator and only the very small particle fines be reworked. This classification may be effected by any of the commercial systems well known to the art. A particular preferred system operating on the fines slurry is the Spitzkasten. This is described in Brown et al., "Unit Operations," Wiley, N.Y., 1950, pp. 84–85.

Regardless of the system used the 0–40 micron fines which pass the cyclones and which are caught in the oil slurry are separated roughly into an 0–10 micron portion which is reworked, and a 10–40 micron portion which is either recycled to the regenerator or reworked, depending upon the attrition rate in the unit. It is contemplated that attrition rates will vary and also the proportion of 0–10 micron vs. 10–40 micron particles which are so produced. Although reworking will generally be carried out on the finest portion of the slurry particles, another method of control of the amount of the desired 10–40 micron fines content of the hydroforming system is by changing the size cut point on the classification system. Thus, for example, if the hydroforming system fines content were above the maximum desired amount, the size range of the catalyst withdrawn for reworking could be broadened.

The present invention provides an excellent method for control of the fines content in a fluid platinum hydroforming unit. It is known that the most active fluid platinum catalysts presently available attrite several times as fast as fluid molybdenum oxide catalyst thus making methods of control of fines content of especial importance. In the present system it is contemplated that conventional cyclones will be used. These pass much of the entrained 0–20 micron material, together with a very small amount of the 20–40 micron catalyst particles. These are all, of course, caught by the present slurry system. Although super efficient cyclones could be used which would retain nearly everything larger than 10 microns, their use would prevent controlling the amount of desired 10–40 micron fines present in the unit. Thus unless conventional cyclones are used, the amount of 10–40 micron fines in the fluid bed may easily exceed the level desired for maximum efficiency. It is contemplated that attrition rates will vary and that the amount of 0–10 micron vs. 10–40 micron fines which are produced will also vary.

This invention will be described hereinbelow as applied to a fluid hydroforming operation. It will be understood, however, that it is equally applicable to fluid catalytic cracking or other hydrocarbon conversion operations employing the fluidized solids technique.

Hydroforming is a well known and widely used process for treating hydrocarbon fractions boiling within the motor fuel or naphtha range to upgrade the same or increase the aromaticity and improve the antiknock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen or hydrogen-rich recycle gas at temperatures of 750–1150° F. in the pressure range of about 50–3000 lbs. per sq. inch and in contact with such catalysts as molybdenum oxide, chromium oxide, or, in general, oxides or sulfides of metals of groups IV, V, VI, VII and VIII of the periodic system of elements alone or generally supported on a base of spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum-oxide or upon a zinc aluminate spinel. Another very effective type of catalyst is platinum impregnated on an aluminum oxide base. This catalyst is effective even with very low platinum contents (e.g. .03 weight percent).

Fluid hydroforming is a process in which naphtha vapors are passed continuously through a dense, fluidized bed of hydroforming catalyst particles in a reaction zone and in which spent catalyst is withdrawn from the dense bed and passed to a separate regeneration zone where inactivating carbonaceous deposits are removed. The regenerated catalyst is then returned to the main reaction vessel. Fluid hydroforming has several fundamental advantages over fixed bed hydroforming such as (1) the operations are continuous, (2) the vessels and equipment can be designed for single rather than dual functions, (3) the reactor temperature is constant and simulates isothermal fixed bed operations, and (4) the regeneration or reconditioning of the catalyst may be readily controlled.

Prior to the present invention it has been known to recover fines entrained with reaction products from the reactor and to return these fines both to the reactor and to the regenerator. It has also been known to recover fines from the flue gases from the regenerator and to transfer them to the reactor. By the present invention it has been discovered that unique advantages are obtained by recovering the 0 to 40 micron fines entrained in the flue gases leaving the regenerator cyclones and returning them to the regenerator. It is desirable to return this fine catalyst to the regenerator, particularly in the case of fluid platinum catalyst hydroformers, because higher fines concentrations can thus be maintained in the reactor (where they result in better gas-solids contacting and higher bed efficiency and increased selectivity) and at the same time the heat required to be supplied to the catalyst is provided both from the heat from the regeneration or burning of the carbonaceous deposits on the catalyst and from the burning of the oil in which the fines are returned.

According to the present invention fines from the regenerator are scrubbed from flue gases in a countercurrent tower using a suitable wash oil or are removed from the flue gases by supplying the oil to a cyclone separator according to well known "wet cyclone" techniques. The oil used is preferably a low quality high boiling stock that is low in metallic contaminants. Typical stocks might be residual stocks, catalytic cycle stock, or gas oils. These oils would boil in the range of above about 700° F. To minimize vaporization of this wash oil the flue gas is partially cooled to below about 800° F. by injecting liquid water or by other cooling before it is supplied to the scrubber or "wet cyclone."

This invention will be more fully understood by reference to the accompanying drawing in which the regenerator fines recovery and control system for hydroforming is illustrated diagrammatically.

Referring to the drawing, the naphtha feed stock, mixed with a large volume of hydrogen-containing recycle gas preheated to substantially reaction temperatures, is passed through line 1 to distribution nozzles arranged at or just above distribution grid 2 near the bottom of reactor vessel 3. This feed stock may be a virgin naphtha, a cracked naphtha, a Fischer-Tropsch naphtha or the like.

Reactor 3 is charged with a mass of finely divided catalyst particles fluidized above grid 2 forming a dense bed having an upper level 4. A stream of hot hydrogen-containing recycle gas is supplied through line 5. Hot regenerated catalyst is added to this stream of gas through line 6 and slide valve 7 and the combined stream is passed to the bottom of reactor 3 below distribution grid 2 or to other known means for uniformly distributing the catalyst and recycle gas to the reactor.

Reaction products are taken overhead through cyclone separator or separators 8 or the like to remove most but not all the entrained catalyst particles. The reaction products are then passed through line 9 to a catalyst fines recovery system not shown and then to suitable product recovery equipment. Catalyst is withdrawn from the reactor dense bed through withdrawal port 10 into withdrawal stripper 11. Stripping gas is introduced through line 12 and stripped catalyst is withdrawn through line 13 and slide valve 14 and is passed to regeneration air line 15 through which the stripped catalyst passes into the bottom of regenerator 16. A fluid bed of catalyst having an upper level 17 is maintained above baffle plate 18. From the regenerator, regeneration gases pass through cyclone separator 19 from which most of the catalyst fines in the regeneration gases are returned to the regenerator fluid bed through cyclone dip leg 20. Regeneration gases are then passed through line 21 to cooler 22. A water spray is supplied through line 23 to this cooler, the water is vaporized, and the gases cooled to below 800° F. are then passed through line 24 to scrubber 25. In scrubber 25 a spray of liquid oil is utilized to separate the remaining catalyst fines in the regeneration gases passing up the column. The slurry formed is then passed through line 26 to pump 27. This pump pressurizes the liquid so that it may be passed through line 28 to slurry settler 29 and from there through line 30, cooler 31 and line 32 past closed valve 33 to spray nozzles in the scrubber 25. As additional oil is needed to be added to the slurry system, it is supplied through line 34 and valve 33. It is contemplated that in this process the scrubber system will be operated preferably so that the slurry from the settler will contain no more than about 0.2 lb. catalyst/gallon in order to prevent excessive equipment erosion. From scrubber 25 the cooled regeneration gases are discharged from the system through line 35.

From slurry settler 29 the concentrated slurry may be passed through line 40, valve 41 and line 42 to a catalyst reworking system. As mentioned previously, if desired a separation of the coarse fraction of the fines from the remaining fines may be conducted so that these coarse fines can be returned to the system through line 42a without being reworked. Slurry is then passed through line 40 and line 43 to slurry recycle pump 44. The thick slurry is then passed through line 45 back to the regenerator dense bed. Air is supplied to the regenerator through line 15 and additional oil is supplied through line 46 and valve 47 if needed to supply additional heat. This additional oil supply is necessary for better balancing of heat requirements of the regenerator independent of the amount of slurry supplied to the regenerator. This is particularly true during such a time as when oil slurry is not being supplied to the regenerator because fines are being reworked.

In order to more fully explain the invention the following example is set forth with the understanding that it is merely illustrative of the invention and that the invention is not restricted to the specific details enumerated therein.

*Example I*

A 180° F. to 350° F. boiling range virgin naphtha from West Texas crude is hydroformed to 95 research clear octane gasoline. The catalyst comprises 0.03 wt. percent platinum supported on an activated alumina support. Reactor pressure is 200 p.s.i., recycle gas rate is 500 s.c.f./b., and the temperature of the catalyst fluid bed is 945° F. Space velocity of the naphtha feed is 0.8 pound of oil per hour per pound of catalyst in the reactor and catalyst circulation to the regenerator is 0.7 pound of catalyst per pound of oil. The regenerator is operated at a temperature of 1050° F. and a pressure of 200 p.s.i.g. Regeneration gases are cooled to 750° F. in cooler 23 and leave scrubber 25 at a temperature of 475° F. The scrubber oil is a West Texas cycle stock from catalytic cracking which has an initial boiling point of about 800° F. Catalyst fines slurry recovery from the regenerator flue gases is 0.0015 pound of catalyst per hour per pound of catalyst in the regenerator. This fines slurry is separated into a coarser and a finer size fraction. The coarser portion of these fines in the size range of about 10–40 microns is concentrated to .03 pound of catalyst per pound of oil before being pumped to the regenerator. The finer portion, 0–10 microns, is removed for reworking into larger particles. The amount of oil supplied to the regenerator is 1.0 lb./day/lb. catalyst in the regenerator. Fines recovery compared to catalyst circulation is 0.0005 lb. fines/lb. catalyst circulated.

It is to be understood that this invention is not lim-

What is claimed is:

1. In a process for the hydroforming of naphtha hydrocarbons in contact with finely divided hydroforming catalyst particles in accordance with the fluidized solids technique wherein hydrocarbon feed stock is contacted with a dense, fluidized bed of catalyst particles in the lower portion of a naphtha hydroforming zone and in which a stream of catalyst is withdrawn from the dense fluidized bed through a stripping zone for circulation to the regenerator, the improvement which comprises effecting a mechanical separation on the hot regeneration flue gases to remove most of the regenerated catalyst entrained in such gases and returning said separated catalyst to the regenerator fluid bed, partially cooling said hot regeneration flue gases to a temperature below about 800° F. to about 750° F., scrubbing said cooled regeneration gases with a heavy oil having an initial boiling point higher than about 800° F. whereby said oil with minimum vaporization thereof picks up both heat and suspended catalyst from said regeneration gases, and passing all said oil and catalyst as a slurry back to the regenerator fluid bed whereby said oil is burned therein to furnish additional heat to the hydroforming catalyst undergoing regeneration.

2. The process of claim 1 in which the catalyst-oil slurry passed back to the regenerator contains less than about 0.2 lb. catalyst/gallon slurry.

3. The process of claim 1 in which the catalyst-oil slurry is classified to separate a coarse catalyst fraction of about 10–40 micron size and a fine fraction of between about 0 and 10 micron size and only the relatively coarse fraction is passed back to the regenerator fluid bed.

4. The process of claim 3 in which the catalyst-oil slurry passed back to the regenerator contains less than about 0.2 lb. catalyst/gallon of slurry.

5. The process of claim 1 in which the catalyst is platinum impregnated on an aluminum oxide base.

6. The process of claim 1 in which the catalyst contains about 0.01 to about 0.1% platinum impregnated upon an aluminum oxide base.

References Cited in the file of this patent

UNITED STATES PATENTS

| | | |
|---|---|---|
| 2,404,071 | Jahnig | July 16, 1946 |
| 2,429,247 | Van Dornick | Oct. 21, 1947 |
| 2,445,351 | Gohr | July 20, 1948 |
| 2,449,027 | Voorhies | Sept. 7, 1948 |
| 2,449,095 | Wheeler et al. | Sept. 14, 1948 |
| 2,746,909 | Hemminger | May 22, 1956 |
| 2,776,930 | McKeague et al. | Jan. 8, 1957 |
| 2,791,542 | Nathan | May 7, 1957 |